(12) United States Patent
Tsai

(10) Patent No.: US 9,811,139 B2
(45) Date of Patent: Nov. 7, 2017

(54) APPARATUS AND METHOD FOR POWER SUPPLY

(71) Applicant: FSP TECHNOLOGY INC., Taoyuan County (TW)

(72) Inventor: Chien-Li Tsai, Taoyuan County (TW)

(73) Assignee: FSP TECHNOLOGY INC., Taoyuan (TW)

( * ) Notice: Subject to any disclaimer, the term of this patent is extended or adjusted under 35 U.S.C. 154(b) by 481 days.

(21) Appl. No.: 14/561,162

(22) Filed: Dec. 4, 2014

(65) Prior Publication Data

US 2015/0180278 A1 Jun. 25, 2015

(30) Foreign Application Priority Data

Dec. 23, 2013 (TW) .............................. 102147830 A

(51) Int. Cl.
*G06F 1/30* (2006.01)
*H02J 9/06* (2006.01)
*H02J 1/10* (2006.01)
*G06F 1/26* (2006.01)

(52) U.S. Cl.
CPC ............ *G06F 1/30* (2013.01); *G06F 1/263* (2013.01); *H02J 1/10* (2013.01); *H02J 9/061* (2013.01); *Y10T 307/344* (2015.04)

(58) Field of Classification Search
CPC ... G06F 1/26; G06F 1/263; G06F 1/28; G06F 1/30; G06F 1/305; H02J 1/10; H02J 9/061; H02J 9/06; H02J 2009/068; Y10T 307/344
See application file for complete search history.

(56) References Cited

U.S. PATENT DOCUMENTS

| 6,787,936 | B2 * | 9/2004 | Nitta | G06F 1/28 307/140 |
| 8,484,491 | B2 * | 7/2013 | Kageyama | H02J 9/061 713/300 |
| 2004/0027110 | A1 * | 2/2004 | Sue | G06F 1/305 323/283 |
| 2012/0117391 | A1 * | 5/2012 | Jacquet | G06F 1/263 713/300 |

(Continued)

FOREIGN PATENT DOCUMENTS

TW I400603 7/2013

OTHER PUBLICATIONS

"Office Action of Taiwan Counterpart Application", dated Mar. 12, 2015, p. 1-p. 7.

*Primary Examiner* — Ryan Johnson
(74) *Attorney, Agent, or Firm* — JCIPRNET

(57) ABSTRACT

An apparatus and a method for power supply are provided. The apparatus for power supply includes a main power circuit, an auxiliary power circuit and a power switching control circuit. The main power circuit is configured to generate a main power suitable to be provided to a first load and a second load for use. The auxiliary power circuit is configured to generate an auxiliary power suitable to be provided to the second load for use. The power switching control circuit is configured to detect a voltage difference between the main power and the auxiliary power and determine whether the apparatus meets a normal power supply condition, so as to select one of the main power and auxiliary power as a power source of the second load.

14 Claims, 3 Drawing Sheets

(56) References Cited

U.S. PATENT DOCUMENTS

2012/0242146 A1* 9/2012 Chang .................. H02J 1/10
                                                      307/29
2013/0261816 A1* 10/2013 Tang .................. H02J 1/00
                                                      700/286

* cited by examiner

US 9,811,139 B2

APPARATUS AND METHOD FOR POWER SUPPLY

CROSS-REFERENCE TO RELATED APPLICATION

This application claims the priority benefit of Taiwan application serial no. 102147830, filed on Dec. 23, 2013. The entirety of the above-mentioned patent application is hereby incorporated by reference herein and made a part of this specification.

BACKGROUND OF THE INVENTION

1. Field of the Invention

The invention relates to a power supply technology, and particularly relates to an apparatus for power supply under a power supply framework having a main power circuit and an auxiliary power circuit and a method for power supply thereof.

2. Description of Related Art

When electronic apparatuses are more and more commonly used, the power consumption thereof also increases accordingly. To reduce the power consumption of electronic apparatuses and provide effective power management, a power management mechanism referred to as the advanced configuration and power interface (ACPI) standard has been used to manage the power of electronic apparatuses, and a state of the whole electronic apparatus is divided into six states (S0 to S5) with different power consumption rates according to the power management mechanism based on the ACPI standard.

For the electronic apparatus using the power management mechanism based on ACPI, the corresponding power supply apparatus thereof supports a power supply framework with a main power circuit (+12V, +5V, +3.3V, −12V, −5V) and an auxiliary power circuit (5 Vsb or 12 Vsb). Under such framework, when an external alternating current (AC) power (i.e. the supply mains) is supplied/input to the power supply apparatus, the power supply apparatus continuously generates and outputs an auxiliary power whether it is in an operation state or in a standby state, so as to supply the auxiliary power to a part of loads (e.g. circuits/elements of a power management controller) in the electronic apparatus requiring continuous operation.

However, due to the circuit specification and design concerning the type of typology, the power conversion efficiency of the conventional auxiliary power circuit is lower than the power conversion efficiency of the main power circuit. Thus, the power supply apparatus may generate too much blind power and thus have a less preferable energy saving performance.

SUMMARY OF THE INVENTION

The invention provides an apparatus and a method for power supply capable of improving the issue of the conventional art.

An apparatus for power supply of the invention includes a main power circuit, an auxiliary power circuit, and a power switching control circuit. The main power circuit is configured to generate a main power, wherein the main power is suitable to be provided to a first load and a second load for use. The auxiliary power circuit is configured to generate an auxiliary power, wherein the auxiliary power is suitable to be provided to the second load for use. The power switching control circuit is coupled to the main power circuit and the auxiliary power circuit. The power switching control circuit is configured to detect a voltage difference between the main power and the auxiliary power, so as to determine whether the apparatus for power supply meets a normal power supply condition and thus select one of the main power and the auxiliary as a power source of the second load according to the determined result.

According to an embodiment of the invention, when the power switching control circuit determines that the apparatus for power supply meets the normal power supply condition, the main power is provided to the second load for use through the power switching control circuit, and when the power switching control circuit determines that the apparatus for power supply does not meet the normal power supply condition, the auxiliary power is solely provided to the second load for use.

According to an embodiment of the invention, when the power switching control circuit detects that a voltage value of the main power is greater than or equal to a voltage value of the auxiliary power by a predetermined value, it is determined that the apparatus for power supply meets the normal power supply condition, and when the power switching control circuit detects that the voltage value of the main power is not greater than or equal to the voltage value of the auxiliary power by the predetermined value, it is determined that the apparatus for power supply does not meet the normal power supply condition.

According to an embodiment of the invention, when the power switching control circuit detects that the voltage value of the main power is continuously greater than or equal to the voltage value of the auxiliary power for a predetermined period, it is determined that the apparatus for power supply meets the normal power supply condition, and when the power switching control circuit detects that the voltage value of the main power is not continuously greater than or equal to the voltage value of the auxiliary power for the predetermined period, it is determined that the apparatus for power supply does not meet the normal power supply condition.

According to an embodiment of the invention, the power switching control circuit includes a switch element and a switch control circuit. The switch element is coupled between output ends of the main power circuit and the auxiliary power circuit. The switch control circuit is configured to detect voltage values of the main power and the auxiliary power and determines accordingly whether the apparatus for power supply meets the normal power supply condition, so as to control whether the switch element is turned on or off.

According to an embodiment of the invention, the switching control circuit turns on the switch element when determining that the apparatus for power supply meets the normal power supply condition, and turns off the switch element when determining that the apparatus for power supply does not meet the normal power supply condition.

According to an embodiment of the invention, the switching control circuit further turns off the switch element when receiving a turn-off notification signal sent by the user, so that the auxiliary power is solely provided to the second load for use.

According to an embodiment of the invention, the apparatus for power supply further includes a protection circuit. The protection circuit is coupled to the main power circuit and the switching control circuit and configured to detect an operation state of the main power circuit, and sends an operation suspending signal when the operation state of the main power circuit is abnormal, so that the main power circuit stops generating the main power in response to the operation suspending signal.

According to an embodiment of the invention, the switching control circuit determines that the apparatus for power supply does not meet the normal power supply condition in response to the operation suspending signal and simultaneously turns off the switch element, so that the auxiliary power is solely provided to the second load for use.

A method for power supply of the invention includes steps as follows: generating a main power and an auxiliary power, wherein the main power is suitable to be provided to a first load and a second load for use, and the auxiliary power is suitable to be provided to the second load for use; detecting voltage values of the main power and the auxiliary power; determining whether a normal power supply condition is met according to a voltage difference between the main power and the auxiliary power; and selecting one of the main power and the auxiliary power as a power source of the second load according to the determined result.

According to an embodiment of the invention, the step of determining whether the normal power supply condition is met according to the voltage difference between the main power and the auxiliary power includes: when the voltage value of the main power is greater than or equal to the voltage value of the auxiliary power by a predetermined value, determining that the normal power supply condition is met; and when the voltage value of the main power is not greater than or equal to the voltage value of the auxiliary power by the predetermined value, determining that the normal power supply condition is not met.

According to an embodiment of the invention, the step of determining whether the normal power supply condition is met according to the voltage difference between the main power and the auxiliary power includes: when the voltage value of the main power is continuously greater than equal to the voltage value of the auxiliary power for a predetermined period, determining that the normal power supply condition is met; and when the voltage value of the main power is not continuously greater than or equal to the voltage value of the auxiliary power for the predetermined period, determining that the normal power supply condition is not met.

According to an embodiment of the invention, the step of selecting one of the main power and the auxiliary power as the power source of the second load according to the determined result includes: when it is determined that the normal power supply condition is met, providing the main power to the first load and the second load for use simultaneously; and when it is determined that the normal power supply condition is not met, providing solely the auxiliary power source to the second load for use.

According to an embodiment of the invention, the step of selecting one of the main power and the auxiliary power as the power source of the second load according to the determined result further includes: when it is determined that the normal power supply condition is met, turning on a switch element coupled between the first load and the second load; and when it is determined that the normal power supply condition is not met, turning off the switch element.

According to an embodiment of the invention, the method for power supply further includes the steps as follows: determining whether a turn-off notification signal sent by the user is received; and if it is determined that the turn-off notification signal is received, turning off the switch element, so that the auxiliary power is solely provided to the second load.

According to an embodiment of the invention, the method for power supply further includes steps as follows: detecting an operation state of a main power circuit configured to generate the main power; determining whether the operation state of the main power circuit is abnormal; sending an operation suspending signal when the operation state of main power circuit is abnormal; and determining that the normal power supply condition is not met in response to the operation suspending signal, so as to stop generating the main power, and simultaneously turning off the switch element.

Based on the above, the embodiments of the invention provide the apparatus and method for power supply. The apparatus for power supply is capable of determining whether the main power circuit is in the normal operation state according to the voltage difference between the main power and the auxiliary power. In addition, when the main power circuit is in the normal operation state, the power source of an auxiliary power load is switched to the main power provided by the main power circuit, so that the power conversion efficiency of the apparatus for power supply in general is improved. Also, under the circumstance that the main power circuit does not operate normally, the power switching control circuit disconnects the electrical connection between the main power circuit and the auxiliary power circuit, so as to prevent the current generated by the auxiliary power circuit from being reversely fed back to the main power circuit and thus damaging the circuit.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
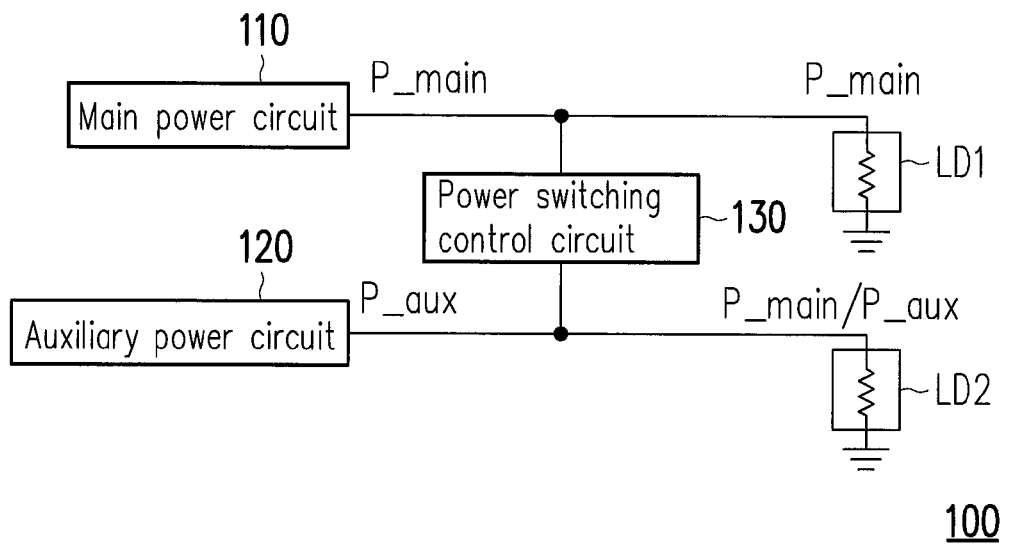
FIG. 1 is a schematic view illustrating an apparatus for power supply according to an embodiment of the invention.

The embodiments of the invention provide an apparatus and a method for power supply. The apparatus for power supply is capable of determining whether a main power circuit is in a normal operation state according to a voltage difference between a main power and an auxiliary power. In addition, when the main power circuit is in the normal operation state, a power source of an auxiliary power load is switched to the main power provided by the main power circuit, so that a power conversion efficiency of the apparatus for power supply in general is improved. In order to make the invention more comprehensible, embodiments are described below as the examples to show the invention. Also, wherever possible, the same reference numbers are used in the drawings and the description to refer to the same or like parts/components/steps.

FIG. 1 is a schematic view illustrating an apparatus for power supply according to an embodiment of the invention. Referring to FIG. 1, an apparatus 100 for power supply (also called as "power supply apparatus") includes a main power circuit 110, an auxiliary power circuit 120, and a power switching control circuit 130. In this embodiment, the apparatus 100 for power supply is suitable to supply power to loads (e.g. a first load LD1 and a second load LD2) of an electronic apparatus (e.g. a tablet PC, a pocket PC, a personal computer, a laptop computer, a personal digital assistant (PDA), a smart phone, etc).

The main power circuit 110 is configured to convert an input voltage, so as to generate a main power P_main for the first load LD1 and the second load LD2 to use. The auxiliary power circuit 120 is configured to convert the input voltage, so as to generate an auxiliary power P_aux for the second load LD2 to use. In addition, the first load LD1 described herein may be referred to as a "main power load", indicating elements/circuits operated in response to the main power P_main in the electronic apparatus. Similarly, the second load LD2 described herein may be referred to as an "auxiliary power load", indicating elements/circuits operated in response to the main power P_main or the auxiliary power P_aux in the electronic apparatus.

Also, in this embodiment, types of circuit typology of the main power circuit 110 and the auxiliary power circuit 120 may be a forward power conversion circuit, a flyback power conversion circuit, an active clamp and half bridge power conversion circuit, an active clamp and full bridge power conversion circuit, or a push-pull power conversion circuit. However, the invention is not limited to the types described above. Frameworks and operations of the various power conversion circuits are in the knowledge that people having ordinary skills in the art of the invention are already familiar with, so no further details in this respect will be described below.

The power switching control circuit 130 is coupled to the main power circuit 110 and the auxiliary power circuit 120. In addition, the power switching control circuit 130 may be configured to detect a voltage difference between the main power P_main and the auxiliary power P_aux, so as to determine whether the apparatus 100 for power supply meets a normal power supply condition and thus choose/select one of the main power P_main and the auxiliary P_aux as a power source of the second load/auxiliary power load LD2 according to the determined result. Also, in some exemplary embodiments, the power switching control circuit 130 is further provided with optional auxiliary determining conditions, which will be described in detail in the embodiments below, so that control of power supply is able to be more accurate.

Specifically, the power switching control circuit 130 mainly uses the voltage difference between the main power P_main and the auxiliary power P_aux as a basis to determine whether the apparatus 100 for power supply meets the normal power supply condition.

For example, in an exemplary embodiment, the power switching control circuit 130 may determine whether the apparatus 100 for power supply meets the normal power supply condition by determining whether a voltage value of the main power P_main is greater than or equal to a voltage value of the auxiliary power P_aux by a predetermined value (the predetermined value may be set by the designer, and may be 0V). More specifically, since the voltage value of the main power P_main is generally designed to be greater than or equal to the voltage value of the auxiliary power P_aux, the apparatus 100 for power supply is indicated to meet the normal power supply condition and the main power circuit 110 is in the normal operation state (i.e. a state that the circuit is activated and supplies power normally) if the power switching control circuit 130 determines that the voltage value of the main power P_main is greater than or equal to the voltage value of the auxiliary power P_aux by the predetermined value. Here, the main power P_main generated by the main power circuit 110 is supplied to the second load LD2 for use through the power switching control circuit 130 in addition to being supplied to the first load LD1 for use.

On the contrary, if the power switching control circuit 130 determines that the voltage value of the main power P_main is not greater than or equal to the voltage value of the auxiliary power P_aux by the predetermined value, the apparatus 100 for power supply does not meet the normal power supply condition, and the main power circuit 110 is in an abnormal power supply state (the main power circuit 110 operates abnormally, making the output main power P_main lower than the predetermined output) or turned off (the main power circuit 110 stops outputting the main power P_main). At this time, the auxiliary power P_aux generated by the auxiliary power circuit 120 is solely provided to the second load LD2 for use. Also, under such circumstance, the power switching control circuit 130 disconnects an electrical connection between the main power circuit 110 and the auxiliary power circuit 120, so as to prevent a current output by the auxiliary power circuit 220 from being fed back to the main power circuit 110 to damage the main power circuit 110.

Also, in another exemplary embodiment, the power switching control circuit 130 may determine whether the voltage value of the main power P_main is continuously greater than or equal to the voltage value of the auxiliary power P_aux for a predetermined period (the period may be set by the designer as well). If the power switching control circuit 130 determines that the voltage value of the main power P_main is continuously greater than or equal to the voltage value of the auxiliary power P_aux for the predetermined period, the apparatus 100 for power supply meets the normal power supply condition, and the main power circuit 110 is in the normal operation state.

On the contrary, if the power switching control circuit 130 determines that the voltage value of the main power P_main is not continuously greater than or equal to the voltage value of the auxiliary power P_aux for the predetermined period, the apparatus 100 for power supply does not meet the normal power supply condition, and the main power circuit 110 is in the abnormal power supply state (the main power circuit 110 operates abnormally, making the output main power P_main lower than the predetermined output) or turned off (the main power circuit 110 stops outputting the main power P_main).

In other words, when the main power circuit 110 is in the normal operation state (i.e. the apparatus 100 for power supply meets the normal power supply condition), the apparatus 100 for power supply uses the main power circuit 110 to supply power to both the first load LD1 and the second load LD2. Also, at this time, the auxiliary power circuit 120 may be operated in a light load state/no-load state or may be controlled to cease operating. Namely, the power source of the second load LD2 at this time is the main power circuit 110. On the contrary, when the main power circuit 110 is turned off or in the abnormal power supply state (i.e. the apparatus 100 for power supply does not meet the normal power supply condition), the apparatus 100 for power supply may use solely the auxiliary power circuit 120 to supply power to the second load LD2, and the main power circuit 110 may cease operating at this time. In other words, the power source of the second load LD2 at this time is switched from the main power circuit 110 to the auxiliary power circuit 120.

Based on the power supply mechanism above, since the main power circuit 110 has a higher power conversion efficiency than the auxiliary power circuit 120, replacing the auxiliary power P_aux with the main power P_main to supply power to the second load LD2 when the main power circuit 110 is in the normal operation state allows the apparatus 100 for power supply has a preferable power conversion efficiency in general. On the other hand, when the main power circuit 110 is unable to operate normally (when the system is turned off or the circuit is abnormal, for example), the auxiliary power P_aux may serve as a back-up power (or standby power) to supply power to the second load LD2, so that operations of necessary circuits/elements in the system may be maintained.

Also, regarding a control method merely using a power turn-on signal (e.g. a PS-ON signal according to the ATX standard) to determine whether the main power P_main is coupled to the second load LD2, since such method is unable to determine whether the main power circuit 110 is in the normal operation state, once the main power circuit 110 is abnormal, thus making the voltage value of the main power P_main lower than the voltage value of the auxiliary power P_aux, the current output by the auxiliary power circuit 120 may possibly flow back reversely to the main power circuit 110 through a power coupling path established by the power switching control circuit 130, thus damaging the circuit.

Compared with the above method, the power switching control circuit 130 of this embodiment uses the voltage difference between the main power P_main and the auxiliary power P_aux as basis to determine whether the main power circuit 110 operates normally, and consequently determines whether the main power P_main is coupled to the second load LD2. Therefore, compared with a conventional power supply mechanism using the power turn-on signal to determine whether to provide the main power P_main to the second load LD2, the apparatus 100 for power supply of this embodiment is capable of effectively solving the issue that a current is reversely fed back due to the abnormal operation of the main power circuit 110.

It should also be noted that, as disclosed by the above exemplary embodiment, the operation "determining whether the apparatus 100 for power supply meets the normal power supply condition" executed by the power switching control circuit 130 of this embodiment may be more than merely comparing the voltages of the main power P_main and the auxiliary power P_aux. Other determining conditions (e.g. comparing whether the voltage difference between the main power P_main and the auxiliary power P_aux exceeds the predetermined value or determining whether the voltage value of the main power P_main is continuously greater than the voltage value of the auxiliary power P_aux for the predetermined period, as described above), so as to more accurately determine whether the main power circuit 110 is abnormal. In addition, with the above-mentioned determining mechanism, a misjudgment of the power switching control circuit 130 may be avoided at a booting stage or at a state when other loads are more variable by appropriately setting the predetermined value/period. Besides, the power switching control circuit 130 may use an absolute value or a ratio value of voltages as the basis for comparing the voltage difference between the main power P-main and the auxiliary voltage P_aux according to the design requirement. The invention is not limited thereto.

Also, it should be noted that while it is not shown in the embodiment of FIG. 1, the apparatus 100 for power supply may further include an input conversion stage disposed at a previous stage of the main power circuit 110 and the auxiliary power circuit 120. The input conversion stage may be configured to receive an AC voltage (e.g. an AC supply mains, but the invention is not limited thereto), and converting the AC voltage, so as to provide the input voltage necessary for the main power circuit 110 and the auxiliary power circuit 120 to generate the main power P_main and the auxiliary power P_aux. In addition, the input conversion stage may include an electromagnetic interference (EMI) filter, a bridge rectifying and filtering circuit, and a power factor correction (PFC) converter. Specific frameworks of the EMI filter, the bridge rectifying and filtering circuit, and the PFC converter are also in the knowledge that people having ordinary skills in the art are already familiar with, so no further details in this respect will be described below.

Figure 2:
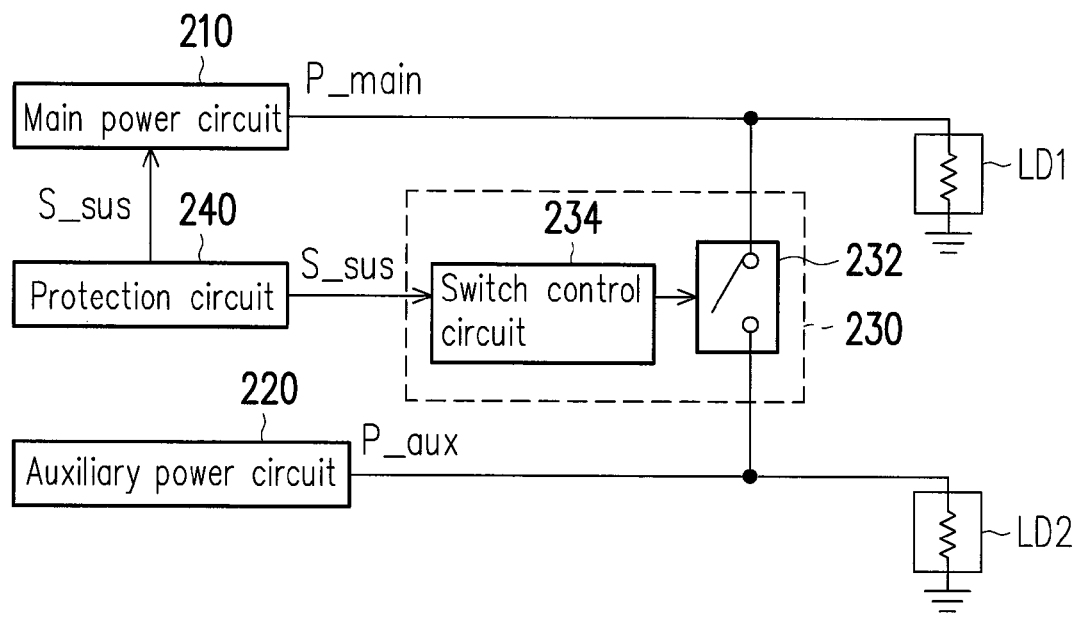
FIG. 2 is a schematic view illustrating an apparatus for power supply according to another embodiment of the invention.

To more clearly describe the embodiments of the invention, FIG. 2 is a schematic view illustrating an apparatus for power supply according to another embodiment of the invention. Referring to FIG. 2, an apparatus 200 for power supply further includes a protection circuit 240 in addition to a main power circuit 210, an auxiliary power circuit 220, and a power switching control circuit 230. In addition, a general framework and an operating mechanism of the apparatus 200 for power supply are substantially the same as those of the apparatus 100 for power supply of the embodiment shown in FIG. 1, except for a difference that the power switching control circuit 230 of this embodiment may be implemented with a framework including a switch element 232 and a switch control circuit 234. In addition, the power switching control circuit 230 may further determine whether the apparatus 200 for power supply meets the normal power supply condition based on whether a protection mechanism of the protection circuit 240 is activated.

Specifically, the protection circuit 240 is coupled to the main power circuit 210 and the switch control circuit 234, and is configured to detect an operation state of the main power circuit 210 and sends an operation suspending signal S_sus when the operation state of the main power circuit 210 is abnormal, so that the main power circuit 210 stops generating the main power P_main in response to the operation suspending signal S_sus. Moreover, in the actual practice, the protection circuit 240 may be an over current protection (OCP) circuit, an over voltage protection (OVP) circuit, and/or an over temperature protection (OTP) circuit. In other words, when the protection circuit 240 determines that the operation state of the main power current 210 is abnormal, a possible scenario is that a load voltage, a load current, and/or an apparatus temperature exceed a predetermined upper limit, for example. However, the invention is not limited thereto.

In addition, in the power switching control circuit 230, the switch element 232 is coupled between output ends (i.e. nodes that the main power circuit 210 and the auxiliary power circuit 220 are respectively coupled to the first load LD1 and the second load LD2) of the main power circuit 210 and the auxiliary main power circuit 220, and is controlled to provide a power coupling path in a turn-on state, so as to couple the main power P_main to the second load LD2. The switch control circuit 234 is configured to detect the voltage values of the main power P_main and the auxiliary power P_aux, so as to control whether the switch element 232 is turned on or off accordingly.

More specifically, the switch control circuit 234 detects and compares the voltage values of the main power P_main and the auxiliary power P_aux, so as to determine whether the apparatus 200 for power supply meets the normal power supply condition. When the switch control circuit 234 determines that the apparatus 200 for power supply meets the normal power supply condition (indicating that the main power circuit 210 is in the normal operation state), the switch control circuit 234 may send a corresponding control signal to turn on the switch element 232, such that the main power P_main may be provided to the second load LD2 through the switch element 232. Besides, when the switch control circuit 234 determines that the apparatus 200 for power supply does not meet the normal power supply condition (indicating that the main power circuit 210 may be abnormal or turned off), the switch control circuit 234 may send another corresponding control signal to turn off the switch element 232, so as to disconnect the power coupling path of the main power circuit 210 to the second load LD2, thereby only using the auxiliary power P_aux provided by the auxiliary power circuit 220 to supply power to the second load LD2.

In this embodiment, in addition to determining whether the apparatus 200 for power supply meets the normal power supply condition based on the voltage difference between the main power P_main and the auxiliary power P_aux detected by the switch control circuit 234 itself, the switch control circuit 234 may further determine whether the apparatus 200 for power supply meets the normal power supply condition according to the operation suspending signal S_sus sent by the protection circuit 240.

More specifically, when the protection circuit 240 detects that the operation state of the main power circuit 210 is abnormal and sends the operation suspending signal S_sus to stop the operation of the main power circuit 210, the switch control circuit 234 may simultaneously determine that the apparatus 200 for power supply does not meet the normal power supply condition in response to the operation suspending signal S_sus sent by the protection circuit 240 and simultaneously turn off the switch element 232. In this way, the switch control circuit 234 may simultaneously disconnect the power coupling path between the main power circuit 210 and the second load LD2 when the main power circuit 210 is turned off due to a circuit protection action for anomaly, so that the auxiliary power P_aux is solely provided to the second load LD2. With the above control mechanism, since the switch element 232 is switched to the turn-off state before the voltage value of the main power P_main decreases, a circumstance that switching of the switch element 232 is delayed because operation/control time of the switch control circuit 234 itself is delayed may be prevented. If the switching of the switch element 232 is delayed, the voltage of the main power P_main may decrease to cause the issue that the current is reversely fed back.

Also, the switch control circuit 234 may also turn off the switch element 232 when receiving a turn-off notification signal sent by the user, so that the auxiliary power circuit 220 solely provides the auxiliary power P_aux for the second load LD2 to use. In addition, the turn-off notification signal may be sent to the switch control circuit 234 when the user triggers a power-off function of an electronic apparatus (the electronic apparatus using the apparatus 200 for power supply), so that the power source of the second load LD2 is switched to the auxiliary power circuit 220 simultaneously when the electronic apparatus is turned off. In other words, assuming that the user turns off the electronic apparatus normally, the switch control circuit 234 no longer needs to compare the voltage difference between the main power P_main and the auxiliary power P_aux to determine whether to switch the power source of the second load LD2 to the auxiliary power circuit 220, but may directly switch the power source in response to the turn-off notification signal.

It should also be noted that the switch control circuit 234 may be implemented with a circuit framework formed by a microcontroller (not shown) and a driving circuit (not shown). In addition, since the microcontroller has a better logic computation and control capability, the microcontroller may be used to perform logic computation and control operations such as determining whether the apparatus for power supply meets the normal power supply condition, so as to determine whether to control the driving circuit to turn on the switch element 232.

Also, the switch element 232 of this embodiment may be implemented with a transistor. In addition, a first end and a second end of the transistor may be respectively coupled to the output ends of the main power circuit 210 and the auxiliary power circuit 220, and a control end of the transistor is coupled to the switch control circuit 234 to determine a turn-on/off state thereof according to a control signal sent by the switch control circuit 234. The transistor may be an N-type transistor or a P-type transistor. If the N-type transistor is chosen, a control signal corresponding to turning on the switch element is a high level signal. Alternatively, if the P-type transistor is chosen, the control signal corresponding to turning on the switch element is a low level signal. However, the invention is not limited to the embodiments above.

Figure 3:
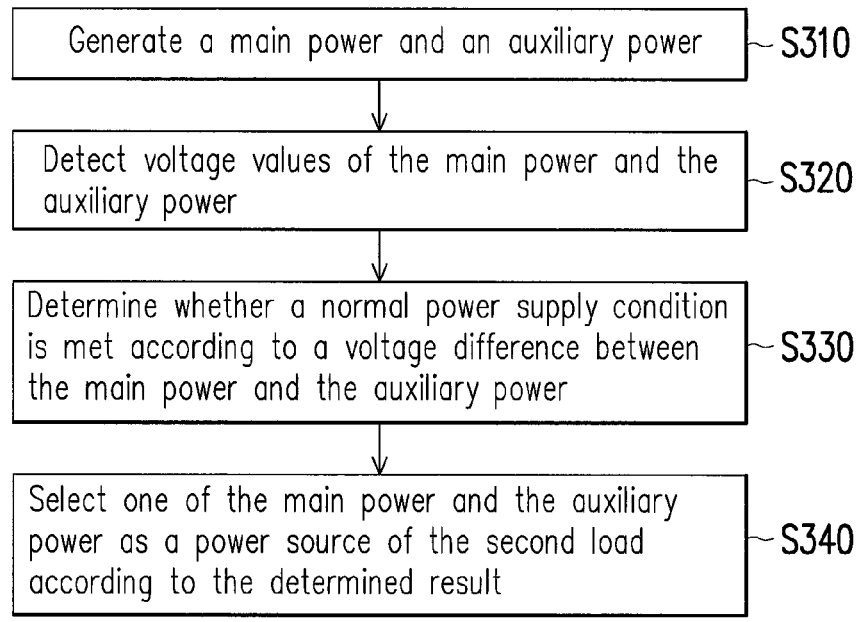
FIG. 3 is a flowchart illustrating a method for power supply according to an embodiment of the invention.

FIG. 3 is a flowchart illustrating a method for power supply according to an embodiment of the invention. In this embodiment, the method for power supply is suitable for the apparatus 100 or 200 for power supply of the embodiments shown in FIG. 1 or 2, or other apparatuses for power supply including a framework having a main power circuit and an auxiliary power circuit. Referring to FIG. 3, the method for power supply includes steps as follows: generating a main power and an auxiliary power, wherein the main power is suitable to be provided to a first load (e.g. LD1) and a second load (e.g. LD2), and the auxiliary power is suitable to be provided to the second load (Step S310); detecting voltage values of the main power and the auxiliary power (Step S320); determining whether a normal power supply condition is met according to a voltage difference between the main power supply and the auxiliary power supply (Step S330); and selecting one of the main power and the auxiliary power as a power source of the second load according to the determined result (Step S340).

Figure 4:
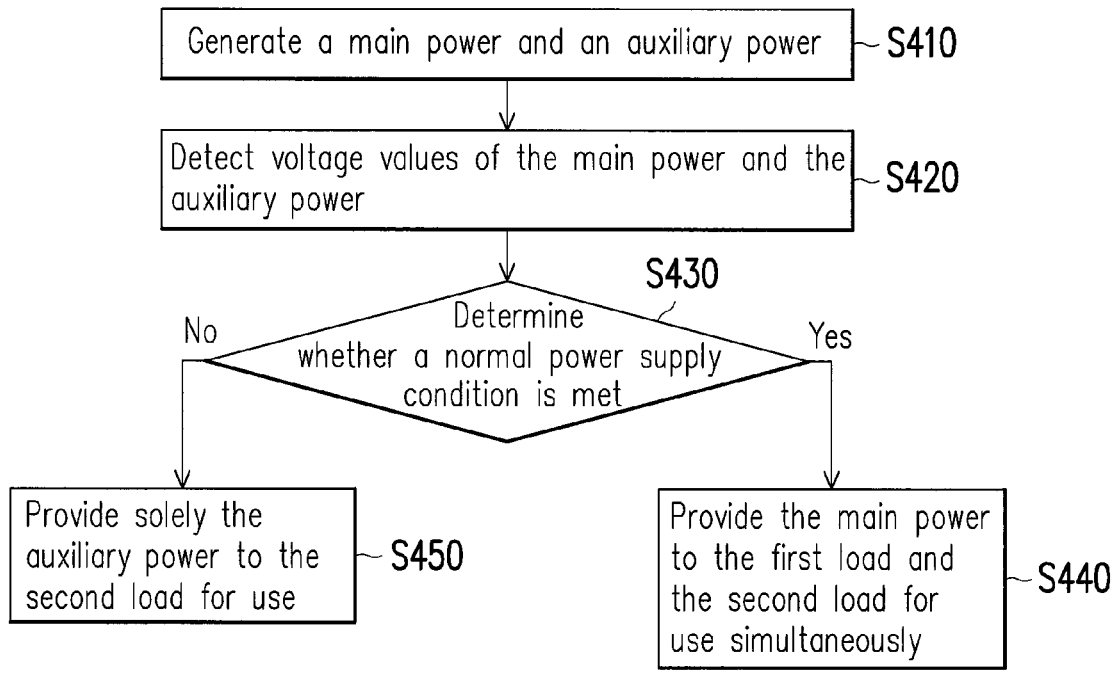
FIG. 4 is a flowchart illustrating a method for power supply according to another embodiment of the invention.

More specifically, the method for power supply of the embodiment shown in FIG. 3 may be further implemented by using the steps shown in FIG. 4. Also, FIG. 4 is a flowchart illustrating a method for power supply according to another embodiment of the invention.

Referring to FIG. 4, in this embodiment, after the steps of generating the main power and the auxiliary power (Step S410) and detecting the voltage values of the main power and the auxiliary power (Step S420), the step of determining whether the normal power supply condition is met (Step S430) follows in the method of this embodiment. In addition, if it is determined that that normal power supply condition is met, the main power is simultaneously provided to the first load and the second load for use (Step S440), and if it is determined that the normal power supply condition is not met, the auxiliary power supply is solely provided to the second load (Step S450).

More specifically, the method of this embodiment may be used in the apparatus 200 for power supply under the framework of the power switching control circuit 230 shown in FIG. 2. In Steps S440 and S450, the method may determine whether to provide the main power to the second load by turning on/off a switch element (e.g. the switch element 232) between the first load and the second load. For example, when the voltage value of the main power is greater than or equal to the voltage value of the auxiliary power, at Step S440, the main power may be coupled to the second load by turning on the switch element. Besides, when the voltage value of the main power is less than the voltage value of the auxiliary power, at Step S450, an electrical connection between the first load and the second load may be disconnected by turning off the switch element, thereby providing solely the auxiliary power to the second load.

Figure 5:
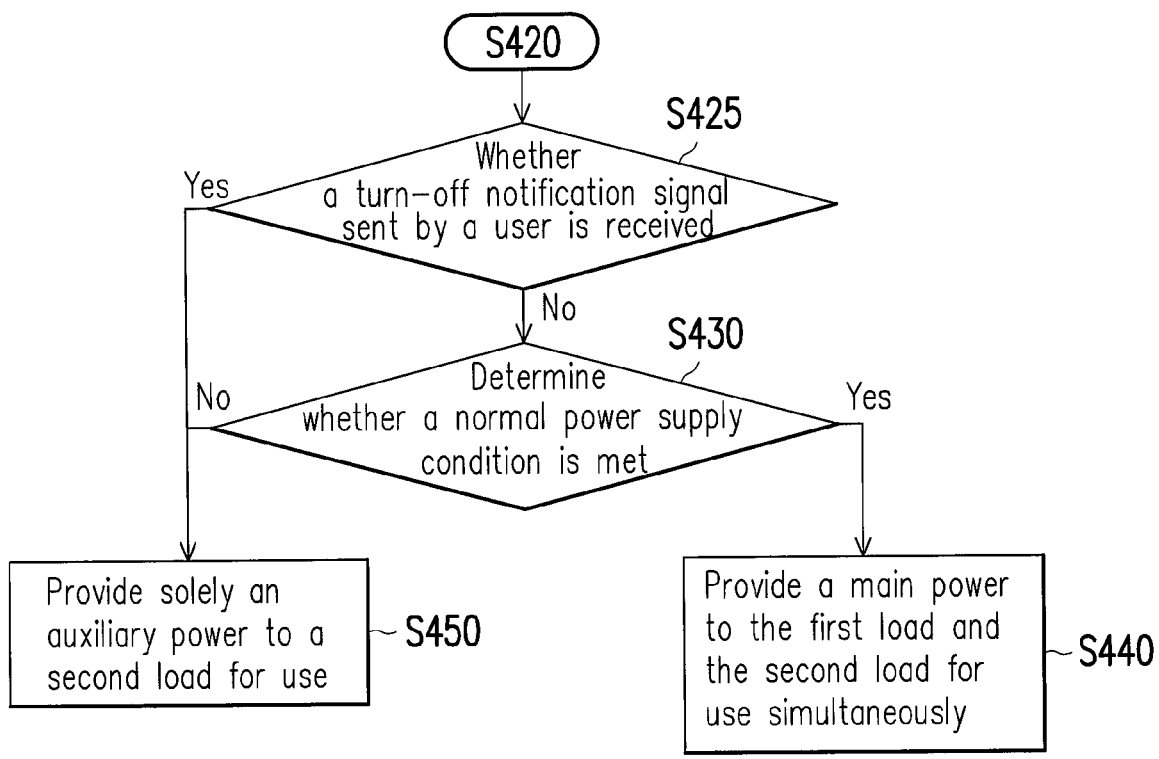
FIG. 5 is a flowchart illustrating a method for power supply according to yet another embodiment of the invention.

Also, in the method according to an exemplary embodiment, as shown in FIG. 5, the method of the embodiment may further determine in advance whether a turn-off notification signal sent by the user is received (Step S425) before Step S430. If it is determined that the turn-off notification signal is received, Step S450 is performed to turn off the switch element, so as to provide solely the auxiliary power to the second load. Alternatively, if it is determined that the turn-off notification signal is not received, Step 430 is performed to further determine whether the normal power supply condition is met.

Moreover, with the description about FIGS. 1 and 2, support and teaching concerning the methods for power supply described in the embodiments of FIGS. 3-5 are sufficiently provided. Therefore, similar or repeated parts are not reiterated herein.

Based on the above, the embodiments of the invention provide the apparatus and method for power supply. The apparatus for power supply is capable of determining whether the main power circuit is in the normal operation state according to the voltage difference between the main power and the auxiliary power. In addition, when the main power circuit is in the normal operation state, the power source of an auxiliary power load is switched to the main power provided by the main power circuit, so that the power conversion efficiency of the apparatus for power supply in general is improved. Also, under the circumstance that the main power circuit does not operate normally, the power switching control circuit disconnects the electrical connection between the main power circuit and the auxiliary power circuit, so as to prevent the current generated by the auxiliary power circuit from being reversely fed back to the main power circuit and thus damaging the circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for power supply, comprising:
   a main power circuit, configured to generate a main power, wherein the main power is suitable to be provided to a first load and a second load for use;
   an auxiliary power circuit, configured to generate an auxiliary power, wherein the auxiliary power is suitable to be provided to the second load for use;
   a power switching control circuit, coupled to the main power circuit and the auxiliary power circuit and configured to detect a voltage difference between the main power and the auxiliary power and determine accordingly whether the apparatus for power supply meets a normal power supply condition, thereby selecting one of the main power and the auxiliary power as a power source of the second load according to the determined result; and
   a protection circuit, coupled to the main power circuit and the power switching control circuit, configured to detect an operation state of the main power circuit, and sending an operation suspending signal when the operation state of the main power circuit is abnormal, so that the main power circuit stops generating the main power in response to the operation suspending signal.

2. The apparatus for power supply as claimed in claim 1, wherein:
   when the power switching control circuit determines that the apparatus for power supply meets the normal power supply condition, the main power is provided to the second load for use through the power switching control circuit, and
   when the power switching control circuit determines that the apparatus for power supply does not meet the normal power supply condition, the auxiliary power is solely provided to the second load for use.

3. The apparatus for power supply as claimed in claim 2, wherein:
   when the power switching control circuit detects that a voltage value of the main power is greater than or equal to a voltage value of the auxiliary power by a predetermined value, it is determined that the apparatus for power supply meets the normal power supply condition; and
   when the power switching control circuit detects that the voltage value of the main power is not greater than or equal to the voltage value of the auxiliary power by the predetermined value, it is determined that the apparatus for power supply does not meet the normal power supply condition.

4. The apparatus for power supply as claimed in claim 3, wherein:
   when the power switching control circuit detects that the voltage value of the main power is continuously greater than or equal to the voltage value of the auxiliary power for a predetermined period, it is determined that the apparatus for power supply meets the normal power supply condition; and
   when the power switching control circuit detects that the voltage value of the main power is not continuously greater than or equal to the voltage value of the auxiliary power for the predetermined period, it is determined that the apparatus for power supply does not meet the normal power supply condition.

5. The apparatus for power supply as claimed in claim 1, wherein the power switching control circuit comprises:
   a switch element, coupled between output ends of the main power circuit and the auxiliary power circuit; and
   a switch control circuit, configured to detect voltage values of the main power and the auxiliary power and determining accordingly whether the apparatus for power supply meets the normal power supply condition, so as to control whether the switch element is turned on or off.

6. The apparatus for power supply as claimed in claim 5, wherein the switching control circuit turns on the switch element when determining that the apparatus for power supply meets the normal power supply condition, and turns off the switch element when determining that the apparatus for power supply does not meet the normal power supply condition.

7. The apparatus for power supply as claimed in claim 5, wherein the switching control circuit further turns off the switch element when receiving a turn-off notification signal sent by a user, so that the auxiliary power is solely provided to the second load for use.

8. The apparatus for power supply as claimed in claim 5, wherein the switch control circuit is coupled to the protection circuit to receive the operation suspending signal, and the switching control circuit determines that the apparatus for power supply does not meet the normal power supply condition in response to the operation suspending signal and simultaneously turns off the switch element, so that the auxiliary power is solely provided to the second load for use.

9. A method for power supply, comprising:
   generating a main power and an auxiliary power, wherein the main power is suitable to be provided to a first load and a second load for use, and the auxiliary power is suitable to be provided to the second load for use;
   detecting voltage values of the main power and the auxiliary power;
   determining whether a normal power supply condition is met according to a voltage difference between the main power and the auxiliary power;
   selecting one of the main power and the auxiliary power as a power source of the second load according to the determined result;
   detecting an operation state of a main power circuit configured to generate the main power;
   determining whether the operation state of the main power circuit is abnormal;
   sending an operation suspending signal when the operation state of the main power circuit is abnormal; and
   determining that the normal power supply condition is not met in response to the operation suspending signal, so as to stop generating the main power.

10. The method for power supply as claimed in claim 9, wherein the step of determining whether the normal power supply condition is met according to the voltage difference between the main power and the auxiliary power comprises:
    when the voltage value of the main power is greater than or equal to the voltage value of the auxiliary power by a predetermined value, determining that the normal power supply condition is met; and
    when the voltage value of the main power is not greater than or equal to the voltage value of the auxiliary power by the predetermined value, determining that the normal power supply condition is not met.

11. The method for power supply as claimed in claim 9, wherein the step of determining whether the normal power supply condition is met according to the voltage difference between the main power and the auxiliary power comprises:
    when the voltage value of the main power is continuously greater than equal to the voltage value of the auxiliary power for a predetermined period, determining that the normal power supply condition is met; and
    when the voltage value of the main power is not continuously greater than or equal to the voltage value of the auxiliary power for the predetermined period, determining that the normal power supply condition is not met.

12. The method for power supply as claimed in claim 9, wherein the step of selecting one of the main power and the auxiliary power as the power source of the second load according to the determined result comprises:
    when it is determined that the normal power supply condition is met, providing the main power to the first load and the second load for use simultaneously; and
    when it is determined that the normal power supply condition is not met, providing solely the auxiliary power source to the second load for use.

13. The method for power supply as claimed in claim 12, wherein the step of selecting one of the main power and the auxiliary power as the power source of the second load according to the determined result further comprises:
    when it is determined that the normal power supply condition is met, turning on a switch element coupled between the first load and the second load; and
    when it is determined that the normal power supply condition is not met, turning off the switch element.

14. The method for power supply as claimed in claim 13, further comprising:
    determining whether a turn-off notification signal sent by a user is received; and
    if it is determined that the turn-off notification signal is received, turning off the switch element, so that the auxiliary power is solely provided to the second load.

* * * * *